(12) United States Patent
Park

(10) Patent No.: US 7,623,748 B2
(45) Date of Patent: Nov. 24, 2009

(54) OPTICAL FIBER UNIT FOR AIR BLOWN INSTALLATION

(75) Inventor: Chan-Yong Park, Seoul (KR)

(73) Assignee: LS Cable Ltd., Anyang (KR)

( * ) Notice: Subject to any disclaimer, the term of this patent is extended or adjusted under 35 U.S.C. 154(b) by 0 days.

(21) Appl. No.: 11/661,770

(22) PCT Filed: Jun. 30, 2005

(86) PCT No.: PCT/KR2005/002073

§ 371 (c)(1),
(2), (4) Date: Jan. 25, 2008

(87) PCT Pub. No.: WO2006/025645

PCT Pub. Date: Mar. 9, 2006

(65) Prior Publication Data

US 2008/0260340 A1    Oct. 23, 2008

(30) Foreign Application Priority Data

Sep. 1, 2004 (KR) .................... 10-2004-0069649

(51) Int. Cl.
*G02B 6/02* (2006.01)

(52) U.S. Cl. ............... 385/128; 385/123; 385/126; 385/127

(58) Field of Classification Search ................ 385/123, 385/126–128
See application file for complete search history.

(56) References Cited

U.S. PATENT DOCUMENTS

| 5,042,907 A | 8/1991 | Bell et al. |
| 5,555,335 A | 9/1996 | Barker et al. |
| 5,557,703 A | 9/1996 | Barker et al. |

FOREIGN PATENT DOCUMENTS

| EP | 0345968 A2 | 12/1989 |
| EP | 0521710 A1 | 1/1993 |
| EP | 1396745 A3 | 4/2004 |
| WO | WO 2004/079424 A1 | 9/2004 |

*Primary Examiner*—Jennifer Doan
(74) *Attorney, Agent, or Firm*—Jones Day

(57) ABSTRACT

The present invention relates to an optical fiber unit for air blown installation, which includes at least one optical fiber; a buffer layer surrounding the optical fiber and made of radiation curing acrylate; an outer layer surrounding the buffer layer and made of radiation curing acrylate; and a group of solid particles attached to a surface of the outer layer and having an average diameter of 80 to 140 μm and a specific weight of 2 to 3 g/cc. Thus, there is provided a structurally stable optical fiber unit, which allows easy control of particles while the optical fiber unit is produced, and also has improved installation properties.

3 Claims, 2 Drawing Sheets

[Fig. 1]
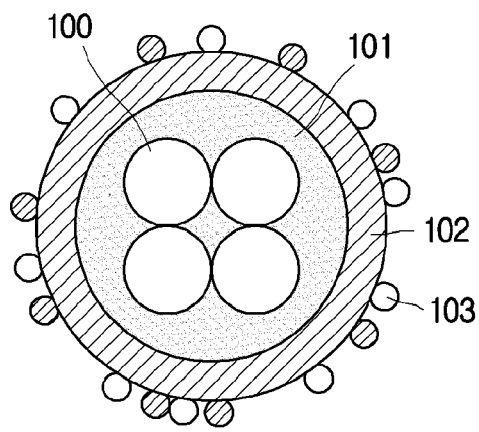
[Fig. 2]
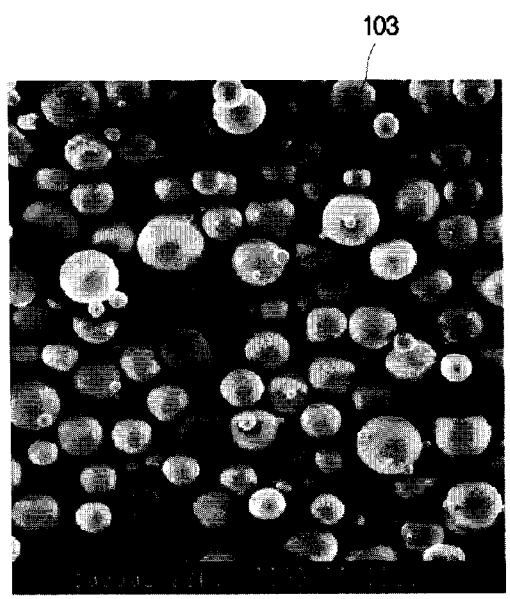
[Fig. 3]
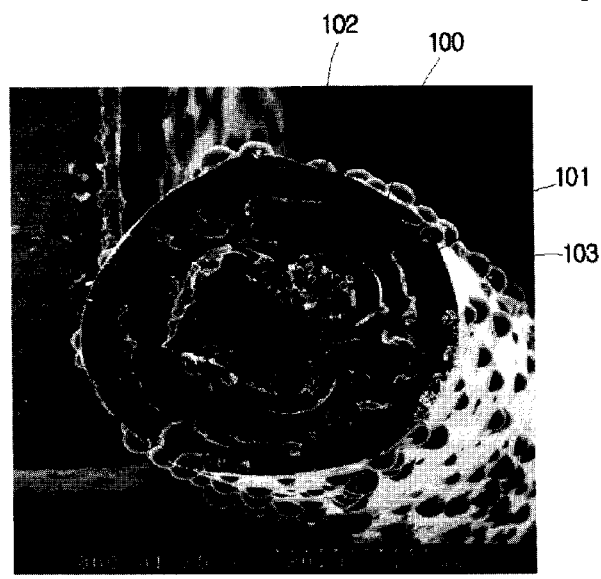

[Fig. 4]
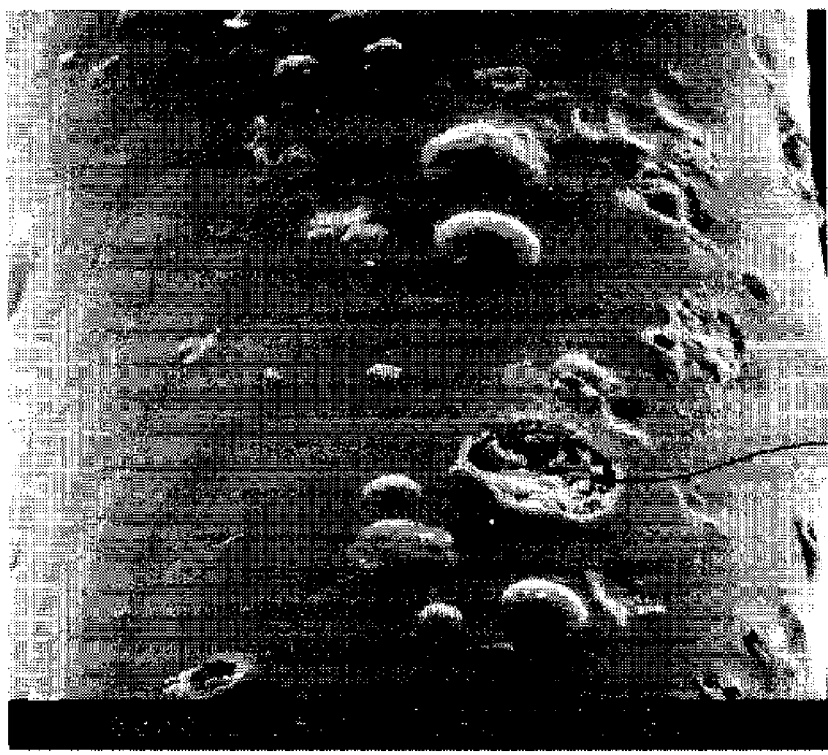
[Fig. 5]
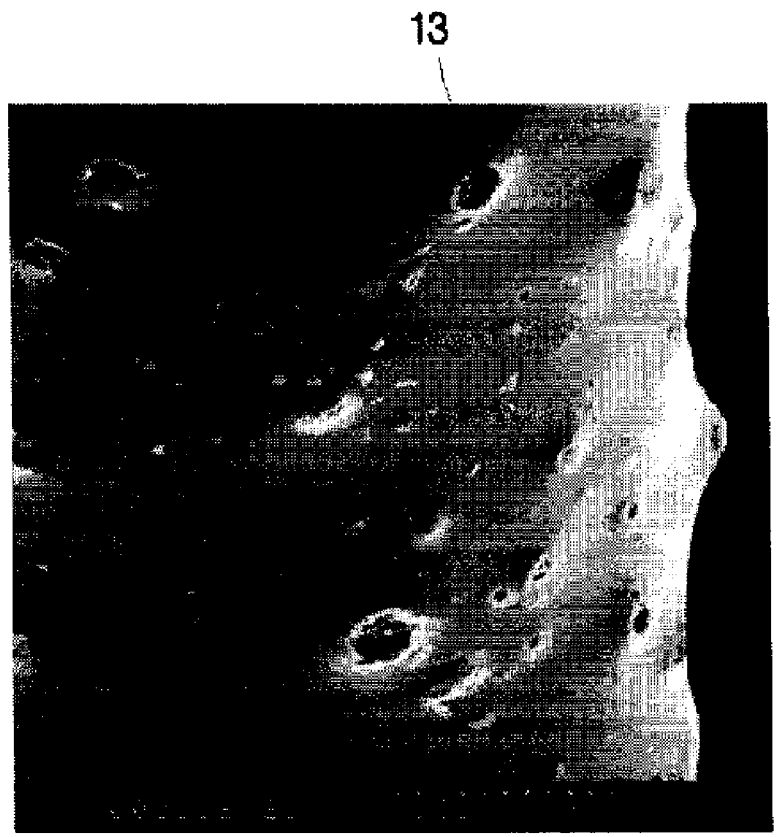

OPTICAL FIBER UNIT FOR AIR BLOWN INSTALLATION

TECHNICAL FIELD

The present invention relates to an optical fiber unit for air blown installation, and more particularly to an optical fiber unit for air blown installation which has a group of solid particles provided on an outer surface for improvement of a drag force during air blown installation and a coating layer for protection of optical fibers are structurally stable.

BACKGROUND ART

In an optical fiber installation method using air pressure, a tube for installation is placed at a desired position and then an optical fiber unit is inserted into the tube using air pressure. This optical fiber installation method ensures easy installation and removal of an optical fiber unit and requires low construction costs, so it is widely used for installing an optical fiber unit in a narrow space such as FTTH (Fiber To The Home).

The optical fiber unit for air blown installation should be provided, which has an outer surface having structure and material capable of maximizing a drag force and also with a coating layer capable of firmly protecting the optical fiber unit due to the reason that it is installed into a tube by fluid drag force.

The techniques related to an optical fiber unit for improving fluid drag force are disclosed in U.S. Pat. Nos. 5,042,907, 5,441,813, 5,555,335, 6,341,188 and so on. Seeing the patents in brief, U.S. Pat. No. 5,042,907 suggests a particle stirring method for previously stirring hollow glass beads in a coating resin and then uniformly coating it on an outer surface of an optical fiber unit. U.S. Pat. No. 5,555,335 suggests a particle blowing method for blowing glass beads toward the outer surface of the optical fiber unit and then adhering them thereto in a static electrical way after resin is coated on the optical fiber but before curing, without previously stirring glass beads in a coating resin. Meanwhile, as a foaming method not using beads, U.S. Pat. No. 5,441,813 discloses that a concave dimple is formed in the outer surface of the optical fiber unit by using foaming polymer material with many pores so as to get much air pressure. In addition, U.S. Pat. No. 6,341,188 discloses a method of making a bent in the outer surface by winding a yarn made of special material (e.g., aramid yarn) around a ribbon-type optical fiber in an inclined pattern so as to get much air pressure.

However, the above conventional techniques have weak points as follows, which deteriorate optical properties of the optical fiber itself as well as installation properties.

In case of stirring beads in resin by using the particle stirring method, an optical fiber unit does not have good bending characteristic since the beads are relatively greater in comparison to the thickness of the coating layer and do not have high co-efficient of elasticity for propulsive force. In addition, cracks may be caused between the beads and the resin, which may be propagated into the optical fiber. Though an alternative of further forming an intermediate layer between the inner buffer layer and the outer surface has also been proposed, this alternative method needs repeating at least three coating processes, which is complicated and consuming much cost.

The particle blowing method has a problem that adhesive force of particles is not uniformly distributed. In addition, since hollow beads are easily dispersed into the air, it is very difficult to control the particles, and these particles may be inhaled into the human body during work.

In particular, the hollow beads have small specific weight but they are not easily stirred in resin uniformly. In addition, the hollow beads are easily broken during the optical fiber unit taking-up, carrying and storing processes as well as the stirring process, which may resultantly cause scratches on the coating portion of the optical fiber unit.

In case of the polymer foaming method, a coefficient of friction is increased due to the foaming polymer material, resulting in decreasing a distance allowed by one-time installation, increasing weight of the optical fiber unit, and deteriorating strength that requires additional coating of a high-strength coating layer.

In addition, in case that a yarn is wound around the outer surface of the optical fiber unit to give a bent thereto, the yarn is inclined in only one direction since a ribbon-type optical fiber has orientation against bending, and the optical fiber unit is twisted during installation due to orientation of the aramid yarn itself, thereby deteriorating installation properties.

DISCLOSURE OF INVENTION

Technical Problem

The present invention is designed in consideration of the above problems, and therefore it is an object of the invention to provide a structurally-stable optical fiber unit for air blown installation, which allows easy control of particles while the optical fiber unit is produced and also has improved installation properties.

Technical Solution

In order to accomplish the above object, the present invention provides an optical fiber unit for air blown installation, which includes at least one optical fiber; a buffer layer surrounding the optical fiber and made of radiation curing acrylate; an outer layer surrounding the buffer layer and made of radiation curing acrylate; and a group of solid particles attached to a surface of the outer layer and having an average diameter of 80 to 140 μm and a specific weight of 2 to 3 g/cc.

Preferably, the average diameter of the solid particles is 90 to 120 μm.

Also preferably, the solid particles are made of soda lime glass and have specific weight of 2.4 to 2.5 g/cc.

BRIEF DESCRIPTION OF THE DRAWINGS

These and other features, aspects, and advantages of preferred embodiments of the present invention will be more fully described in the following detailed description, taken accompanying drawings. In the drawings:

FIG. 1 is a sectional view showing an optical fiber unit for air blown installation according to a preferred embodiment of the present invention;

FIG. 2 is a photograph showing a state of solid particles of the optical fiber unit for air blown installation according to one embodiment of the present invention, before production;

FIG. 3 is a photograph showing a state of a produced optical fiber unit with solid particles of FIG. 2; and FIGS. 4 and 5 are photographs showing surface states of an optical fiber unit according to the prior art.

BEST MODE FOR CARRYING OUT THE INVENTION

The present invention will be described in detail referring to the drawings. the terms used should not be construed as limited to general and dictionary meanings but based on the meanings and concepts of the invention on the basis of the principle that the inventor is allowed to define terms appropriate for the best explanation. Therefore, the description-herein the scope of the invention to be understood that other and modifications could be made thereto without departing from the spirit and scope of the invention.

FIG. 1 is a sectional view showing configuration of an optical fiber unit for air blown installation according to a preferred embodiment of the present invention.

Referring to FIG. 1, the optical fiber unit according to the preferred embodiment of the present invention includes at least one optical fiber 100, a buffer layer 101 surrounding the optical fiber 100, an outer layer 102 coated around the buffer layer 101, and a group of solid particles 103 attached to the surface of the outer layer 102.

The buffer layer 101 and the outer layer 102 for protecting the optical fiber 100 are made of radiation curable acrylate. Here, a curing agent is added to enable instant curing when light is irradiated. The curing agent may employ a radiation curing initiator such as 4,4-bis(dimethyl amino) benzophenon.

The solid particles 103 attached to the surface of the outer layer 102 do not have a hollow in it. Preferably, the solid particles are solid spherical beads.

The solid particles have impact resistance of about 50,000 psi, about 100 times of 500 psi of a hollow bead, so they are not easily broken while an optical fiber unit for air blown installation is produced or installed. If a bead is broken, fluid drag force is seriously decreased during the air blown installation, and lubricous components in the tube for air blown installation may be damaged.

Specific weight of the solid particle is preferably in the level of 2.0 to 3.0 g/cc, more particularly in the level of 2.4 to 2.5 g/cc, so that distribution control for attaching the solid particles 103 to the outer layer 102 may be easily accomplished. If the specific weight of the solid particle is less than 2 g/cc, the solid particles are seriously scattered into the air, which makes it difficult to control their distribution. On the while, if the specific weight of the solid particle is more than 3 g/cc, it is not easy to fly and spray the solid particles in the air.

In addition, the solid particle preferably has a diameter of 80 to 140 μm for facilitating easy installation, more preferably 90 to 120 μm. If the solid particle has a size less than 80 μm, it hardly gives the protrusion effect, so the fluid drag force by air pressure is weakened. On the while, if the solid particle has a size more than 140 μm, it is so protruded to damage the inner coating of the tube for air blown installation and increase weight of the entire optical fiber unit, thereby deteriorating the installation properties.

The solid particle is preferably made of soda lime glass that has relatively smoother surface and thus low coefficient of friction in comparison to ceramic or the like. In this case, the specific weight is preferably in the level of 2.4 to 2.5 g/cc.

Mode for the invention

Embodiment

In order to produce an optical fiber unit for air blown installation, two single-mode optical fibers and a ripcord were mounted to an aggregating device. Then, acrylate was double-coated to form a buffer layer and an outer layer subsequently, the radiation curing process was conducted, and solid glass beads having a diameter of 80 to 140 μm and a specific weight of 2.4 g/cc were made turbulent and sprayed to attach a group of solid particles to the surface of the outer layer.

As a result of SEM observation after production, as shown in FIG. 3, it was found that the glass bead particles 103 kept their uniformly attached state without any crack as before production (see FIG. 2), and an adhered state of the interface between the buffer layer 101 and the outer layer 102 was very uniform, and no micro bending loss was generated in the surface of the optical fiber unit.

In addition, in the test of air blown installation performance, the fluid drag force was improved by means of the beads having uniform and smooth surfaces, showing installation properties in the level of 25 mpm, which is improved at least 10% rather than the prior art.

COMPARATIVE EXAMPLE

In order to produce an optical fiber unit for air blown installation, two single-mode optical fibers and a ripcord were mounted to an aggregating device. Then, a process of forming a coating layer for protection of optical fibers, a process of curing the coating layer by means of radiation, and a process of attaching hollow beads to a surface of the optical fiber unit were conducted. Here, in order to attach the beads, a method of making the beads turbulent and then spraying them (see FIG. 4), or a method of stirring the beads in resin and then spraying them (see FIG. 5) was used.

As a result of SEM observation after production, as shown in FIGS. 4 and 5, most of the beads attached to the surface of the optical fiber unit were broken, and there remained normal beads rarely. In addition, it was found that installation properties were deteriorated in comparison to the above embodiment. Moreover, due to the surface damage 13 caused by the broken beads during installation, minute hurts were generated in the inner side of the installation tube, which requires additional coating and is possibly apt to deteriorate installation properties when the optical fiber is re-installed.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

The optical fiber unit for air blown installation according to the present invention as described above gives the following effects.

First, shape or attached state of particles are kept agreeably, so installation properties are excellent.

Second, since particles has impact resistance, fluid drag force may be maintained even during reinstallation, and no damage is caused to the inner wall of the installation tube.

Third, since beads with optimized specific weight are provided, particles are not scattered into the air and not contaminating the air during the producing process, and the particles may be easily controlled into a turbulent state.

Fourth, since the probability of breakdown of the particles during the producing, taking-up and using processes of the optical fiber unit is remarkably decreased, the optical fiber unit may be easily handled.

Fifth, since particles with optimized size are provided, the entire weight of the optical fiber unit and the fluid drag force may be kept in a suitable level.

Sixth, since the interfacial adhesive force between the buffer layer and the outer layer is excellent, the optical fiber may be well protected.

The invention claimed is:

1. An optical fiber unit for air blown installation, comprising:
    at least one optical fiber;
    a buffer layer surrounding the optical fiber and made of radiation curing acrylate;
    an outer layer surrounding the buffer layer and made of radiation curing acrylate and
    a plurality of solid particles attached to a surface of the outer layer and having an average diameter of 80 to 140 μm and a specific weight of 2 to 3 g/cc,
    wherein the solid particles are made of soda lime glass.

2. The optical fiber unit for air blown installation according to claim 1, wherein the average diameter of the solid particles is 90 to 120 μm.

3. The optical fiber unit for air blown installation according to claim 1, wherein the specific weight of the solid particles is 2.4 to 2.5 g/cc.

* * * * *